United States Patent [19]

Mahdjuri

[11] 4,239,604

[45] Dec. 16, 1980

[54] SELECTIVE LAYER FOR ABSORBING COMPARTMENT OF SOLAR COLLECTORS

[76] Inventor: Faramarz S. Mahdjuri, Via S. Sebastiano 33, Bergamo, Italy

[21] Appl. No.: 40,521

[22] Filed: May 21, 1979

[30] Foreign Application Priority Data

Jun. 2, 1978 [CH] Switzerland ............... 6033/78

[51] Int. Cl.³ .................. C25D 9/08; F24J 3/02
[52] U.S. Cl. .................. 204/56 R; 204/92; 126/901
[58] Field of Search .......... 126/901; 204/56 R, 56 M, 204/43 T, 48, 49, 58, 92

[56] References Cited

U.S. PATENT DOCUMENTS

| | | | |
|---|---|---|---|
| 2,834,725 | 5/1958 | Scheer et al. | 204/43 T |
| 2,844,530 | 7/1958 | Wesley et al. | 204/40 |
| 3,717,510 | 2/1973 | Boose et al. | 148/6.24 |
| 4,080,269 | 3/1978 | Scholz et al. | 204/56 R |

*Primary Examiner*—Howard S. Williams
*Assistant Examiner*—William Leader
*Attorney, Agent, or Firm*—Charles E. Brown

[57] ABSTRACT

For preparing nearly-ideal black body layers for collecting and exploiting solar energy, layers of sulfides of the metals of the iron series, Ni, Fe, Co, are produced by electrolyzing the corresponding thiocyanates in aqueous solution.

High absorption values are obtained concurrently with low emission values.

7 Claims, No Drawings

SELECTIVE LAYER FOR ABSORBING COMPARTMENT OF SOLAR COLLECTORS

The expression "selective layers" is to be construed as layers which have the properties of a nearly ideally blackbody absorber for the radiations of the solar spectrum (0.25 to 2.5 μm) which, however, have but a scanty admittance power towards the infrared (heating) radiations having a wavelength over 2.50 μm.

A comparatively large number of metallic oxides or sulfides spread over a metallic backing have the selective properties aforesaid.

A possibility of producing selective layers consists in separating electrolytically metallic compounds on backing metals.

In the production of layers with the procedure referred to above, the cathodic reduction of ions of rhodanide (thiocyanate) in solutions of nickel and zinc salts is known. Such a procedure is exploited in the "black nickel plating" in which nickel and zinc are caused to become separated at the cathode in the form of a mixed sulfide. "Black chromium plating" is an electrolytic procedure in which a cheaper chromium oxide is caused to become separated from a chromic-acid containing bath (see: Oberflaeche-Surface, 11 (1170), 12, page 302 and seqq.). Black cobalt layers can be produced from electrolytes which are composed of chlorides, and also from other cobalt salts such as, for example, the sulfate, nitrate or acetate and by an alkali-rhodanid (see German Disclosure DT No. 25 56 716).

The black-nickel layers known heretofore lends themselves poorly as selective absorber layers since they have an unsatisfactory stability over long periods of time at high temperatures and more particularly under vacuum, very presumably due to the component parts made of zinc.

Although black-nickel layers having no zinc component parts are vacuum stable (for example, only nickel salts and alkali-rhodanid solution), it is likewise true that it is difficult to provide absorption values over 0.9 and emission values under 0.1.

Black-cobalt layers have a comparatively satisfactory absorption value and also emission value, provided that the aqueous procedure is carried out correctly; if not so, the alkali metal salts which are in the solution bring about a rise of the emission value.

The principal object of the present invention is to provide black coating layers satisfactory effects as regards the severe technical prerequisites in the operation of a selective absorber apparatus and which afford a high absorption power towards solar radiations concurrently with a low terminal admittance power.

The basis principle of the present invention is that the cations of the sulfide systems of the iron series can be substituted within a wide range of concentrations.

The advantages which can be achieved by applying the present invention lie more particularly in that, when applying the procedure according to this invention it becomes possible to form in a very simple way layers of sulfides of the iron series, said layers having a very high absorption power ($\alpha > 0.95$) within the solar radiation spectrum, and a small emission power ($\epsilon < 0.1$) for the thermal radiations.

Inasmuch as the thickness of the layer determines the physical properties of the layer itself, it is possible to provide an optimum layer thickness by properly adjusting the processing parameters such as current intensity and duration of the electrolysis until a definite value has been arrived at.

Several examples of practical application of the invention will be described in detail hereinafter.

(a) Selective absorber layers in the iron series can be obtained from electrolysis of a thiocyanate of the iron series, the saline concentration of which may be varied within a wide range. The degree of concentration of the thio-cyanate can be varied in the range from 1% to 30%.

A typical composition of the electrolyte contains 6% of nickel++ thiocyanate. Appropriate current intensities lie within the range from 0.1 to 5 ampere per square decimeter (A/dm$_2$).

The duration of the electrolysis lies in the range from 3 to 120 seconds.

Other typical compositions of the electrolyte are: 3% of Cobalt++ thiocyanate, or 7% Iron++ thiocyanate.

Current intensity and duration of the electrolysis lie still within the same ranges specified above.

(b) Layers of selective absorber mixed sulfide layers in the iron series can be obtained from electrolytes of a mixture formed by thiocyanates of the iron series. The composition of the baths as to the contents of salts may vary within a wide range.

The total concentration may vary within the range from 1% to 30%.

Typical electrolyte compositions are:
(a) 4% Cobalt++ thiocyanate + 2% Nickel++ thiocyanate
(b) 5% Cobalt++ thiocyanate + 1% Iron++ thiocyanate
(c) 4% Nickel++ thiocyanate + 3% Cobalt++ thiocyanate
(d) 4% Nickel++ thiocyanate + 2% Iron++ thiocyanate.

The current intensity can be adjusted within the range from 0.1 to 5 A/dm$^2$ and the duration of the electrolysis may vary between 3 and 120 seconds.

The lowest emission values are obtained on a silver backing ($\epsilon \sim 0.06$) with an absorption value $\alpha_s$ of 0.96 with a solution of cobalt thiocyanate.

The emission values for a copper backing vary in the range 0.07 to 0.12 consistently with the characteristics of the backing and the conditions of the electrolyte. The counter electrode which is preferred is one of a metal of the iron series.

The value of the pH of the bath must be between 6 and 7.

I claim:

1. An electrolytic method for applying a black layer to a metal substrate with said black layer having an absorption coefficient greater than 0.9 for the solar spectrum and an emissivity of less than 0.1 for infrared thermal radiation up to 400° K., characterized in that the electrolyte utilized consist solely of an aqueous solution of one or more water-soluble thiocyanates selected from the group consisting of iron thiocyanate, cobalt thiocyanate, and nickel thiocyanate.

2. Method according to claim 1, characterized in that the ratio by weight of the thiocyanate or thiocyanates of the iron series to the water is on the order of 1:99 to 30:70.

3. Method according to claim 1 or claim 2, characterized in that there is utilized a current density of between 0.1 and 5A/dm$^2$ and the duration of the electrolysis is between 3 and 120 sec.

4. Method according to claim 1, characterized in that the metal backing has an emission coefficient of less than 0.1

5. Method according to claim 4, characterized in that the metal backing is composed of copper or a copper-coated material.

6. Method according to claim 4, characterized in that the metal backing is composed of silver or a silver-coated material.

7. Method according to claim 4, characterized in that the metal backing is composed of nickel or a nickel-coated material.

* * * * *